United States Patent
Ryu (10) Patent No.: US 8,872,489 B2
(45) Date of Patent: Oct. 28, 2014

(54) REGULATOR AND HIGH VOLTAGE GENERATOR INCLUDING THE SAME

(75) Inventor: Je Il Ryu, Seoul (KR)

(73) Assignee: SK Hynix Inc., Gyeonggi-do (KR)

( * ) Notice: Subject to any disclaimer, the term of this patent is extended or adjusted under 35 U.S.C. 154(b) by 155 days.

(21) Appl. No.: 13/602,079

(22) Filed: Aug. 31, 2012

(65) Prior Publication Data

US 2013/0083573 A1 Apr. 4, 2013

(30) Foreign Application Priority Data

Oct. 4, 2011 (KR) .......................... 10-2011-0100711

(51) Int. Cl.
G05F 1/00 (2006.01)
H02M 3/07 (2006.01)

(52) U.S. Cl.
CPC ........................................ *H02M 3/07* (2013.01)
USPC ............................................ 323/273; 323/266

(58) Field of Classification Search
USPC ......... 323/273, 274, 275, 280, 281, 304, 311, 323/313, 314, 315, 266
See application file for complete search history.

(56) References Cited

U.S. PATENT DOCUMENTS

| | | | | | |
|---|---|---|---|---|---|
| 4,553,048 | A * | 11/1985 | Bynum et al. | ................. | 323/315 |
| 5,293,112 | A * | 3/1994 | Takahashi | ...................... | 323/315 |
| 5,926,062 | A * | 7/1999 | Kuroda | ......................... | 327/538 |
| 5,966,007 | A * | 10/1999 | Okada et al. | .................. | 323/315 |
| 6,417,655 | B2 * | 7/2002 | Mack | ............................. | 323/313 |
| 6,954,058 | B2 * | 10/2005 | Ota et al. | ....................... | 323/315 |
| 2001/0011886 | A1 * | 8/2001 | Kobayashi | ..................... | 323/281 |
| 2006/0043945 | A1 * | 3/2006 | Sohn et al. | ..................... | 323/273 |
| 2008/0285198 | A1 * | 11/2008 | Morino | ......................... | 361/93.9 |
| 2009/0322295 | A1 * | 12/2009 | Scoones et al. | ............... | 323/282 |
| 2010/0289465 | A1 * | 11/2010 | Elran | ............................. | 323/281 |
| 2010/0327834 | A1 * | 12/2010 | Lowe, Jr. | ....................... | 323/282 |
| 2011/0285363 | A1 * | 11/2011 | Mai et al. | ....................... | 323/223 |

FOREIGN PATENT DOCUMENTS

| | | | |
|---|---|---|---|
| KR | 1020080095593 A | 10/2008 | |
| KR | 100911866 B1 | 8/2009 | |
| KR | 10-1005122 B1 | 12/2010 | |

OTHER PUBLICATIONS

Kwang Ho Baek, et al. English Translation of Korean Patent Document 1020080095593.*

* cited by examiner

*Primary Examiner* — Gary L Laxton
*Assistant Examiner* — Alex Torres-Rivera
(74) *Attorney, Agent, or Firm* — William Park & Associates Patent Ltd.

(57) ABSTRACT

A regulator includes a current path unit coupled between an input terminal and a ground terminal and including a first current determination unit coupled between the input terminal and a control node and configured to supply the high voltage to the control node so that a first or second current path is selected depending on a voltage of the control node, and a second current determination unit coupled between the control node and the ground terminal and configured to control the voltage of the control node depending on an input voltage, a voltage supply unit configured to supply the high voltage to an output terminal depending on the voltage of the control node, a voltage division unit configured to create a division voltage, and an amplification unit configured to amplify a difference between the division voltage and a first reference voltage.

12 Claims, 5 Drawing Sheets

REGULATOR AND HIGH VOLTAGE GENERATOR INCLUDING THE SAME

CROSS-REFERENCE TO RELATED APPLICATION

The present application claims priority to Korean patent application number 10-2011-0100711 filed on Oct. 4, 2011, in the Korean Intellectual Property Office, which is incorporated herein by reference in its entirety.

BACKGROUND

1. Technical Field

Example embodiments relate to a high voltage generator and, more particularly, to a high voltage generator capable of reducing current consumption.

2. Related Art

A semiconductor memory device, in particular, a flash memory device requires high voltage for performing operations. A charge pump circuit for generating the high voltage is used in the flash memory device. A voltage regulator is used to control output voltage of the charge pump circuit. In a known regulator, the increase or decrease of current consumed in the regulator is changed depending on a high voltage output range. Thus, a large amount of current is necessary to maintain a pumping voltage. The required current leads to an increase in an internal consumption current (ICC), and thus the internal consumption current (ICC) of a memory chip is greatly influenced. Accordingly, the amount of current consumed in the regulator of the high voltage generator should be controlled.

BRIEF SUMMARY

In accordance with example embodiments, current necessary to drive a charge pump circuit can be minimized by minimizing current consumed by a regulator.

A regulator according to an aspect of the present disclosure includes a current path unit coupled between an input terminal and a ground terminal and configured to include a first current determination unit coupled between the input terminal and a control node and configured to supply the high voltage of a high voltage generator to the control node so that a first or second current path each having a different current load is selected depending on a voltage of the control node and a second current determination unit coupled between the control node and the ground terminal and configured to control the voltage of the control node by changing the current load depending on an input voltage, a voltage supply unit configured to supply the high voltage to an output terminal depending on the voltage of the control node, a voltage division unit configured to divide the high voltage supplied to the output terminal to create a division voltage, and an amplification unit configured to amplify a difference between the division voltage of the voltage division unit and a first reference voltage and output the amplified voltage to the second current determination unit.

A regulator according to another aspect of the present disclosure includes a current path unit coupled between an input terminal and a ground terminal and configured to include a first current determination unit coupled between the input terminal and a control node and configured to supply the high voltage of a high voltage generator to the control node and autonomously control a current load depending on a voltage of the control node and a second current determination unit coupled between the control node and the ground terminal and configured to control the voltage of the control node by changing the current load depending on an input voltage, a voltage supply unit configured to supply the high voltage to an output terminal depending on the voltage of the control node, a voltage division unit configured to divide the high voltage supplied to the output terminal, and an amplification unit configured to amplify a difference between the division voltage of the voltage division unit and a first reference voltage and output the amplified voltage to the second current determination unit.

In accordance with yet another aspect of the present disclosure, there is provided a high voltage generator including a first regulator for stabilizing an output voltage of a charge pump into a first regulation voltage and a second regulator for converting the first regulation voltage into a regular voltage, wherein the second regulator includes a current path unit coupled between an input terminal and a ground terminal and configured to include a first current determination unit coupled between the input terminal and a control node and configured to supply the high voltage of a high voltage generator to the control node so that a first or second current path having a different current load is selected depending on a voltage of the control node and a second current determination unit coupled between the control node and the ground terminal and configured to control the voltage of the control node by changing the current load depending on an input voltage, where the second regulator is configured to supply a high voltage to an output terminal.

DESCRIPTION OF EMBODIMENTS

Hereinafter, some example embodiments of the present disclosure will be described in detail with reference to the accompanying drawings. The figures are provided to allow those having ordinary skill in the art to understand a scope of the embodiments of this disclosure.

Figure 1:
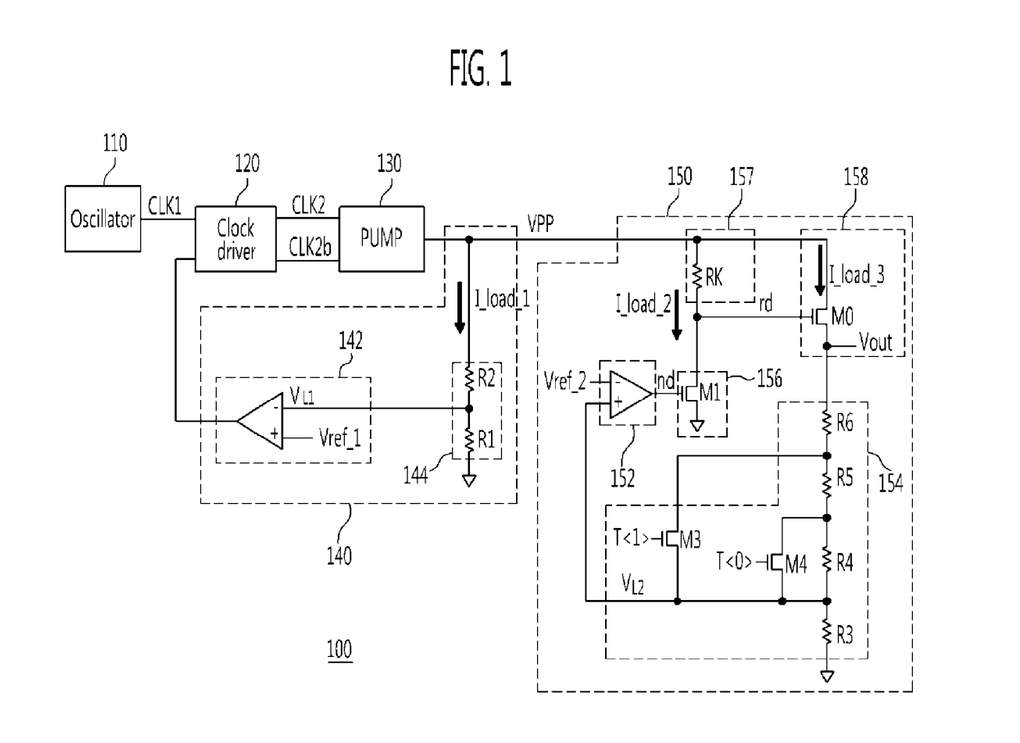
FIG. 1 is a circuit diagram of a high voltage generator according to a first embodiment of this disclosure.
Figure 4A:
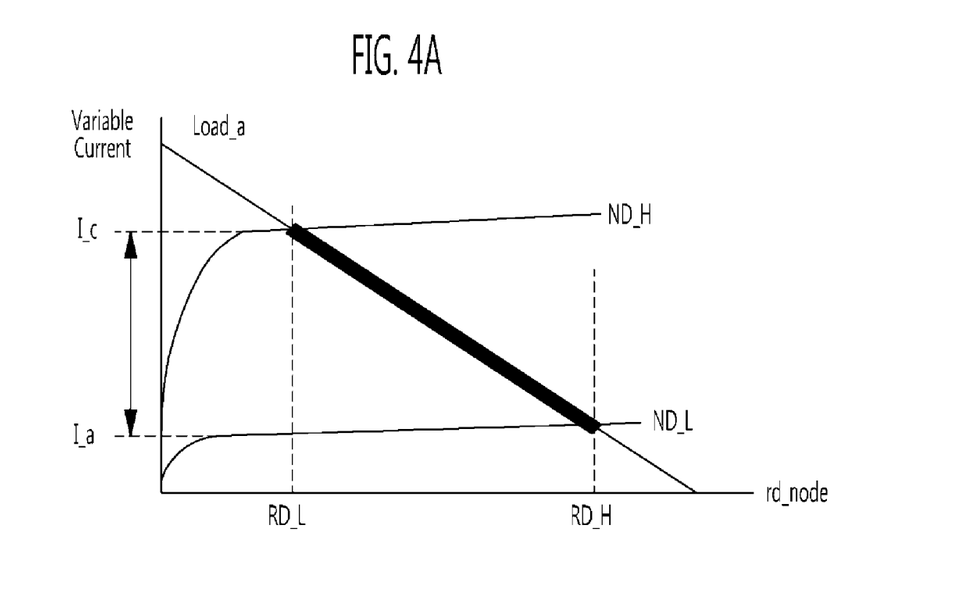
FIGS. 4A to 4C are waveforms illustrating current loads according to voltage of a control node in the high voltage generators of FIGS. 1 to 3.

FIG. 1 is a circuit diagram of a high voltage generator according to a first embodiment of this disclosure, and FIG. 4A is a waveform illustrating a current load according to voltage of a control node in the high voltage generator of FIG. 1.

Referring to FIG. 1, the high voltage generator 100 according to the first embodiment of this disclosure includes an oscillator 110, a clock driver 120, a charge pump 130, a first regulator 140, and a second regulator 150.

The oscillator 110 generates a clock signal CLK1 having a specific frequency and outputs the clock signal CLK1 to the clock driver 120.

The clock driver 120 generates clock signals CLK2 and CLK2b having opposite levels by delaying the clock signal CLK1 in response to the output signal of a first comparator 142 included in the first regulator 140. To this end, the clock driver 120 includes a first inverter group (not shown) in which n inverters are coupled in series and a second inverter group (not shown) in which (n+1) inverters are coupled in series.

The charge pump 130 generates a pumping voltage VPP by performing a pumping operation in response to the clock signals CLK2 and CLK2b.

The first regulator 140 stabilizes the pumping voltage VPP into a regular voltage and supplies the stabilized pumping voltage VPP as a first regulation voltage. The first regulator 140 includes a first voltage divider 144 for generating a first division voltage VL1 by dividing the pumping voltage VPP, and the first comparator 142 for controlling the operation of the clock driver 120 by comparing the first division voltage VL1 and a first reference voltage Vref_1.

The first voltage divider 144 includes a plurality of passive elements (preferably, first and second resistors R1 and R2) and outputs the first division voltage VL1 to the first comparator 142 according to a ratio of resistances of the resistors R1 and R2.

The first and the second resistors R1 and R2 are coupled in series between the output terminal of the pumping voltage VPP and a ground terminal. The first division voltage VL1 is inputted to the first comparator 142 according to a ratio of resistances of the resistors R1 and R2.

If, as a result of the comparison, the first reference voltage Vref_1 is higher than the first division voltage VL1, the first comparator 142 outputs a signal of a high level to the clock driver 120. To this end, the first comparator 142 includes an amplifier (e.g., an OP AMP) having a non-inverting terminal (+) to which the first reference voltage Vref_1 is inputted and an inverting terminal (−) to which the first division voltage VL1 is inputted.

Accordingly, the final pumping voltage VPP becomes the first regulation voltage.

A ripple output of the first regulator 140 may be severe because the first regulator 140 generates the first regulation voltage VPP by controlling only whether the charge pump 130 is operated. In order to temper the ripple output, the second regulator 150 using a current control method is further added.

The second regulator 150 generates a second regulation voltage by converting the first regulation voltage VPP into a regular voltage. The second regulator 150 includes an amplification unit 152, a second voltage divider 154, a current path unit including first and second current determination units 157 and 156, and a voltage supply unit 158.

The second voltage divider 154 includes a plurality of passive elements (preferably, third to sixth resistors R3 to R6). The second voltage divider 154 generates a second division voltage VL2 by dividing the second regulation voltage according to a ratio of resistances of the resistors R3 to R6. The second voltage divider 154 includes the third to sixth resistors R3 to R6 coupled in series between an output terminal Vout and the ground terminal, an NMOS transistor M4 coupled between the third resistor R3 and the fifth resistor R5 in order to change the ratio and configured to couple the third resistor R3 and the fifth resistor R5 in response to a first control signal T<0>, where the NMOS transistor M4 may operate as a switching element. The second voltage divider 154 may also include an NMOS transistor M3 coupled between the third resistor R3 and the sixth resistor R6 and configured to couple the third resistor R3 and the sixth resistor R6 in response to a second control signal T<1> in order to change the ratio, where the NMOS transistor M3 may operate as a switching element. The second voltage divider 154 outputs the second division voltage VL2 to the amplification unit 152 according to a ratio of the resistances.

The amplification unit 152 controls the operation of the second current determination unit 156 by amplifying a difference between the second division voltage VL2 and a second reference voltage Vref_2. To this end, the amplification unit 152 includes an amplifier (e.g., an OP AMP) having an inverting terminal (−) to which a second reference voltage Vref_2 is inputted, and a non-inverting terminal (+) to which the second division voltage VL2 is inputted. Here, the second reference voltage Vref_2 having the same voltage level as the second division voltage VL2 is supplied. The amplification unit 152 outputs a difference between the second division voltage VL2 actually inputted and the second reference voltage Vref_2 Accordingly, the amplification unit 152 outputs an analog signal according to the difference. The amplification unit 152 may output the analog signal to an output node nd.

The first current determination unit 157 and the second current determination unit 156 form a current path between the output terminal of the first regulator 140 and the ground terminal. The first current determination unit 157 includes a resistor RK coupled between the output terminal of the charge pump 130 and the second current determination unit 156. The second current determination unit 156 includes an NMOS transistor M1 turned on based on the output voltage of the amplification unit 152, thus the NMOS transistor M1 may operate as switching element. The NMOS transistor M1 is coupled between the first current determination unit 157 and the ground terminal, and the NMOS transistor M1 is configured to form a current path between the output terminal of the charge pump 130 (or the output terminal of the first regulator 140) and the ground terminal. A diode (i.e., a unilateral element) (not shown) for preventing an adverse current may be further included, where the unilateral element may be coupled between the NMOS transistor M1 and the ground terminal.

As described above, the amplification unit 152 outputs an analog signal according to a difference between the second reference voltage Vref_2 and the division voltage VL2, where the amplification unit 152 outputs the analog signal to the output node nd. Thus, a current path is formed through the second current determination unit 156. Here, the amount of current flowing through the formed current path is increased as the second division voltage VL2 becomes higher than the second reference voltage Vref_2. Furthermore, when the current path is formed, the first regulation voltage VPP is decreased. When the second division voltage VL2 is lower than the second reference voltage Vref_2, a low voltage is outputted from the amplification unit 152 in the form of a comparison signal. Thus, the NMOS transistor M1 is turned off, thereby cutting off the current path.

The voltage supply unit 158 supplies the first regulation voltage VPP to the output terminal Vout of the second regulator 150 depending on the voltage of a control node rd. To this end, the voltage supply unit 158 includes an NMOS transistor M0 coupled between the output terminal of the charge pump 130 and the output terminal Vout of the second regulator 150, where the transistor NMOS transistor M0 may operate as a switching element. Here, the voltage of the control node rd between the resistor RK and the second current determination unit 156 is supplied to the gate of the NMOS transistor M0.

If the current path is not formed, the voltage supply unit 158 directly supplies the first regulation voltage VPP to the gate of the NMOS transistor M0, thereby turning on the NMOS transistor MO. Thus, the first regulation voltage VPP is supplied to the output terminal Vout of the second regulator 150. If the current path is formed, however, the degree that the NMOS transistor M0 is turned on is changed depending on voltage supplied to the gate of the NMOS transistor M0. Thus, the amount of the first regulation voltage VPP supplied to the output terminal Vout of the second regulator 150 is also changed.

A load current consumed by the first regulator 140 and the second regulator 150 of the high voltage generator 100 is determined by the sum of a first load current I_load_1, a second load current I_load_2, and a third load current I_load_3. The first regulation voltage VPP maintains a fixed voltage, but the second regulation voltage of the output terminal Vout ranges from a maximum value Vout_H to a minimum value Vout_L. The maximum value Vout_H of the second regulation voltage is (R6+R5+R4+R3)/(R3)*Vref_2 when the NMOS transistor M4 and the NMOS transistor M3 are turned off, and the minimum value Vout_L thereof is (R6+R3)/(R3)*Vref_2 when the NMOS transistor M4 is turned off and the NMOS transistor M3 is turned on. Accordingly, the first load current I_load_1 and the third load current I_load_3 have a fixed value, whereas the second load current I_load_2 has a variable value.

A change of the first load current I_load_1 to the third load current I_load_3 is described below.

The first regulation voltage VPP is determined by the first reference voltage Vref_1 and a ratio of resistances of the first resistor R1 and the second resistor R2 (i.e., VPP=(R1+R2)/(R1)*Vref_1. Accordingly, the first load current I_load_1 has a value of Vref_1/R1. When the first reference voltage Vref_1 and resistance of the first resistor R1 are determined, the first load current I_load_1 becomes regular.

As described above, the gate of the NMOS transistor M0 is coupled to the control node rd, and the source thereof is coupled to the output terminal Vout of the second regulator 150. Thus, voltage of the control node rd and voltage of the output terminal Vout have a difference equal to the threshold voltage Vth of the NMOS transistor M0 (i.e., Vrd=Vout+Vth). Since the voltage of the output terminal Vout of the second regulator 150 ranges from the maximum value Vout_H to the minimum value Vout_L, the voltage of the control node rd ranges from a maximum value Vrd_H (=Vout_H+Vth) to a minimum value Vrd_L (=Vout_L+Vth).

Referring to FIG. 4A, the second load current I_load_2 of the high voltage generator 100 according to the first embodiment of this disclosure varies depending on a first load curve Load_a. Since the second load current I_load_2 is determined by VPP−RD/RK, the second load current I_load_2 has the first load curve Load_a in a load curve in which the voltage of the control node rd is an X axis and current is a Y axis. Here, the second load current I_load_2 varies depending on the resistance of the resistor RK because the first load curve Load_a has a varying slope according to the resistance of the resistor RK.

As described above, the voltage of the control node rd varies depending on a gate voltage ND of the NMOS transistor M1 included in the second current determination unit 156. Accordingly, the second load current I_load_2 is determined by an intersecting point of the first load curve Load_a and the Id curve of the NMOS transistor M1.

If the gate voltage ND is high, a current path is formed between the control node rd and the ground terminal because the NMOS transistor M1 is turned on. Accordingly, the voltage of the control node rd is lowered. If the gate voltage ND is low, the NMOS transistor M1 is not turned on, and thus a current path is not formed between the control node rd and the ground terminal. Accordingly, the voltage of the control node rd remains high.

When the gate voltage ND is a minimum value ND_L, the intersecting point of the first load curve Load_a and the Id curve of the NMOS transistor M1 is a maximum value RD_H of voltage of the control node rd. In this case, the second load current I_load_2 has a minimum value I_a. When the gate voltage ND is a maximum value ND_H, the intersecting point of the first load curve Load_a and the Id curve of the NMOS transistor M1 is a minimum value RD_L of voltage of the control node rd. In this case, the second load current I_load_2 has a maximum value I_c.

As described above, the second load current I_load_2 has a variable current between the minimum value I_a and the maximum value I_c depending on the voltage of the control node rd.

The third load current I_load_3 is regular because it is determined as Vref_2/R3 irrespective of the voltage range Vout_L to Vout_H of the output terminal Vout.

Consequently, the first load current I_load_1 and the third load current I_load_3 have fixed values, whereas the second load current I_load_2 has a variable value.

This disclosure provides regulators and a high voltage generator which can maintain the lowest current consumption while controlling the amount of the second load current I_load_2.

Figure 2:
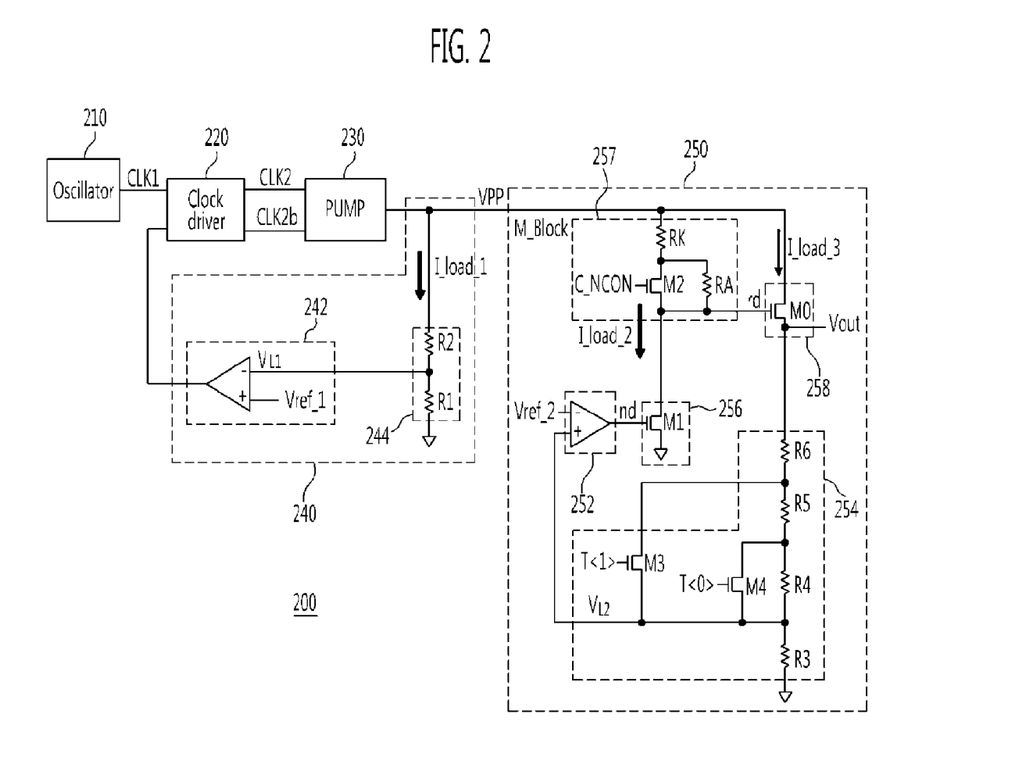
FIG. 2 is a circuit diagram of a high voltage generator according to a second embodiment of this disclosure.

FIG. 2 is a circuit diagram of a high voltage generator according to a second embodiment of this disclosure.

Referring to FIG. 2, the high voltage generator 200 according to the second embodiment of this disclosure includes an oscillator 210, a clock driver 220, a charge pump 230, a first regulator 240, and a second regulator 250. The oscillator 210, the clock driver 220, the charge pump 230, and the first regulator 240 have the same constructions as those of the high voltage generator 100 of FIG. 1, and thus a redundant description thereof is omitted for simplicity.

The second regulator 250 includes a current path unit including a first current determination unit 257 and a second current determination unit 256, a voltage supply unit 258, a voltage division unit 254, and an amplification unit 252.

The current path unit may be coupled between an input terminal and a ground terminal. The current path unit includes the first current determination unit 257 and the second current determination unit 256. The first current determination unit 257 is coupled between the input terminal and a control node rd. The first current determination unit 257 supplies a high voltage (i.e., a second regulator voltage VPP) from the first regulator 240 to the control node rd so that one of first and second current paths having different current loads is selected depending on voltage of the control node rd.

The first current determination unit 257 includes a first resistor RK, a second resistor RA, and an NMOS transistor M2 which may operate as a switching element. The first resistor RK is coupled between the input terminal and the control node rd. The NMOS transistor M2 and the second resistor RA are coupled in parallel between the first resistor RK and the control node rd. When the voltage of the control node rd is a specific level or higher, the NMOS transistor M2 couples the first resistor RK and the control node rd in response to a gate signal C_NCON. The first current determination unit 257 may further include a comparator (not shown) for comparing a preset reference voltage and the voltage of the control node rd and outputting a result of the comparison to the gate of the NMOS transistor M2.

The second current determination unit 256 is coupled between the control node rd and the ground terminal and is configured to control the voltage of the control node rd by changing a current load depending on voltage of the output node nd of the amplification unit 252. The second current determination unit 256 includes an NMOS transistor M1 coupled between the control node rd and the ground terminal and configured to couple the control node rd and the ground terminal in response to the output signal of the amplification unit 252. An NMOS transistor M1 has a gate coupled to the output terminal nd of the amplification unit 252, a drain coupled to the control node rd, and a source coupled to the ground terminal. Although not shown in FIG. 2, the second current determination unit 256 may further include a unilateral element (e.g., a diode) coupled between the NMOS transistor M1 and the ground terminal.

The voltage supply unit 258 supplies the high voltage VPP to an output terminal Vout depending on the voltage of the control node rd. The voltage supply unit 258 includes an NMOS transistor M0 for controlling the amount of the high voltage VPP, supplied to the output terminal Vout, depending on the voltage of the control node rd. The NMOS transistor M0 has a gate coupled to the control node rd, a drain coupled to an input terminal, and a source coupled to the output terminal Vout.

The voltage division unit 254 divides the voltage supplied to the output terminal Vout. The voltage division unit 254 includes a third resistor R3 to a sixth resistor R6 coupled in series between the output terminal Vout and the ground terminal. A composite resistance of the third resistor R3 to the sixth resistor R6 is varied depending on whether an NMOS transistor M4 and an NMOS transistor M3 are turned on. Here, a division voltage VL2 supplied to the third resistor R3 is inputted to the amplification unit 252.

When the amplification unit 252 receives the division voltage VL2 and a reference voltage Vref_2, the amplification unit 252 amplifies a difference between the division voltage VL2 and the reference voltage Vref_2 and outputs the amplified voltage in the form of an analog signal. The amplification unit 252 outputs the analog signal to the output node nd by amplifying the difference between the division voltage VL2 and the reference voltage Vref_2 in order to control the voltage of the control node rd. The amplification unit 252 may include an amplifier (e.g., an OP AMP) having an inverting terminal (−) to which the reference voltage Vref_2 is inputted and a non-inverting terminal (+) to which the division voltage VL2 is inputted.

A method of controlling the second load current I_load_2 of the second regulator 250 is described below.

Figure 4B:
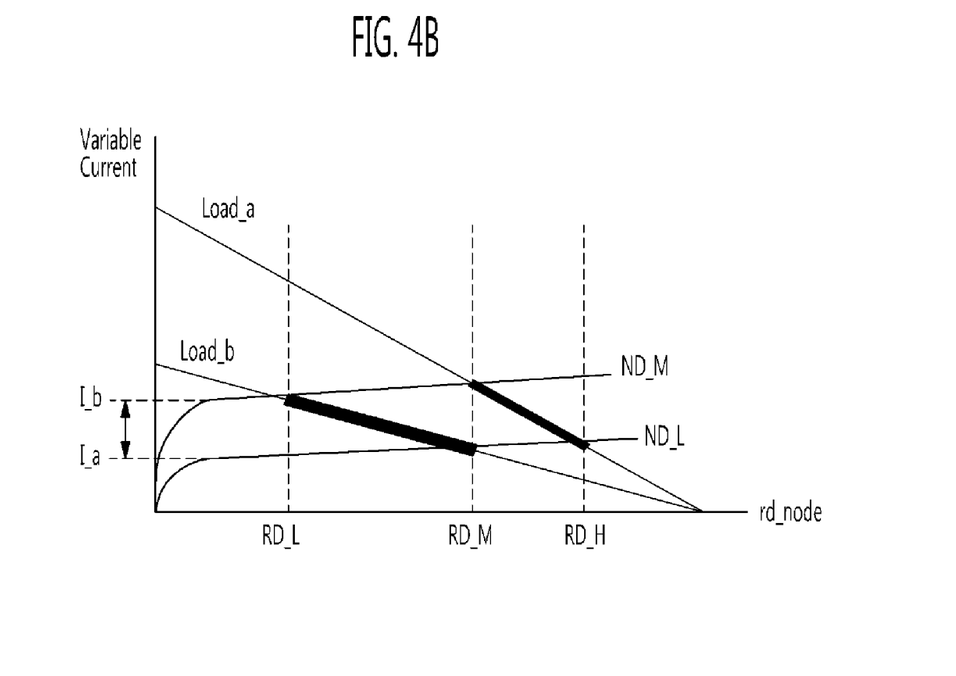

FIG. 4B is a waveform illustrating current loads according to voltage of the control node rd in the high voltage generator 200 of FIG. 2.

Referring to FIGS. 2 and 4B, in the second embodiment of this disclosure, the amount of the second load current I_load_2 can be minimized by controlling a load curve of the first and the second current determination units 257 and 256 for determining the second load current I_load_2. The second regulator 100 of FIG. 1 includes only the resistor RK, and the first current determination unit 257 controls the resistance of the resistor RK at the two load curves in order to suppress an increase of the maximum current I_c.

A factor to determine the amount of the second load current I_load_2 in FIG. 4A is the resistor RK. If the output range Vout_H to Vout_L of the second regulation voltage VPP is divided into a first section Vout_H to Vout_M and a second section Vout_M to Vout_L, a first load curve Load_a according to the resistance of the resistor RK controls the entire section RD_H to RD_L of voltage of the control node rd, but there exists a current path (when C_NCON=High is supplied to the gate of NMOS transistor M2) ranging from the first resistor RK to the NMOS transistor M1 depending on a first load curve Load_a to control the first section RD_H to RD_M and a current path (when C_NCON=Low is supplied to the gate of NMOS transistor M2) ranging from the first resistor RK to the second resistor RA depending on a second load curve Load_b to control the second section RD_M to RD_L. In this case, a shift range of the second load current I_load_2 becomes a second range I_a to I_b instead of the first range I_a to I_c in FIG. 4A. Accordingly, current necessary to maintain the output voltage (i.e., the second regulation voltage VPP) of the charge pump 230 by reducing the shift range of the second load current I_load_2 can be minimized.

Figure 3:
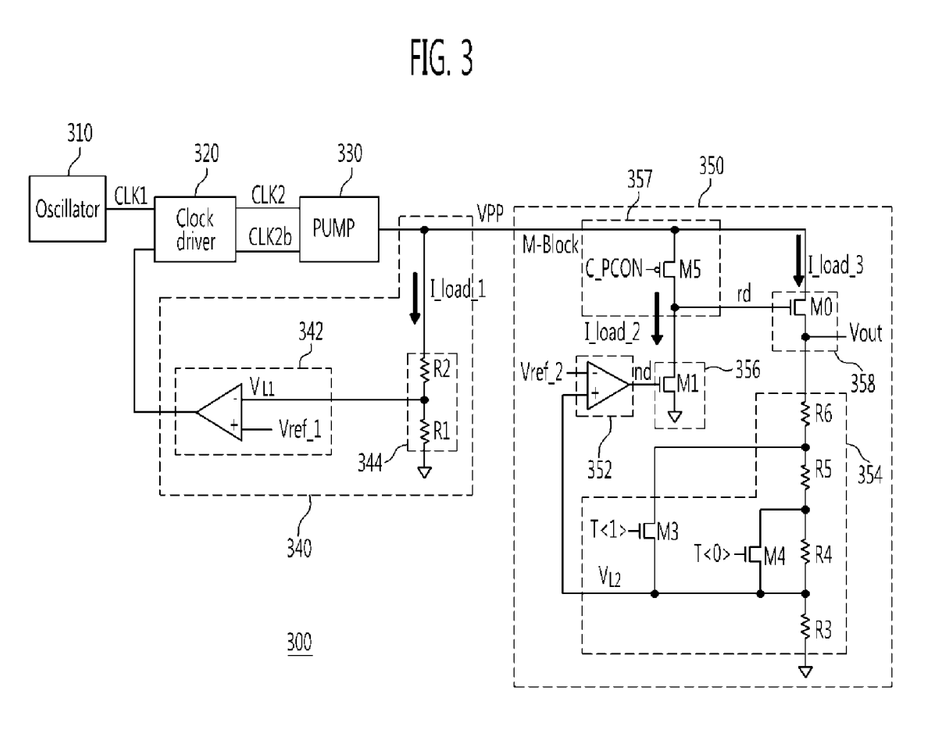
FIG. 3 is a circuit diagram of a high voltage generator according to a third embodiment of this disclosure.

FIG. 3 is a circuit diagram of a high voltage generator according to a third embodiment of this disclosure.

The high voltage generator 300 according to the third embodiment of this disclosure has the same construction as the high voltage generator 200 of FIG. 2 except that a first current determination unit 357 may differ. Therefore, a redundant description thereof of substantially similar components is omitted for simplicity.

Referring to FIG. 3, the first current determination unit 357 includes a high voltage PMOS transistor M5, which may operate as a switching element, coupled between the input terminal and the control node rd and configured to supply the high voltage VPP to the control node rd in response to a voltage supply signal C_PCON.

The high voltage PMOS transistor M5 has a high breakdown voltage BV.

In the high voltage generator 300 according to the third embodiment of this disclosure, the high voltage PMOS transistor M5 may be used in a part corresponding to the variable resistor circuit of FIG. 2 in order to minimize the amount of the second load current I_load_2.

Figure 4C:
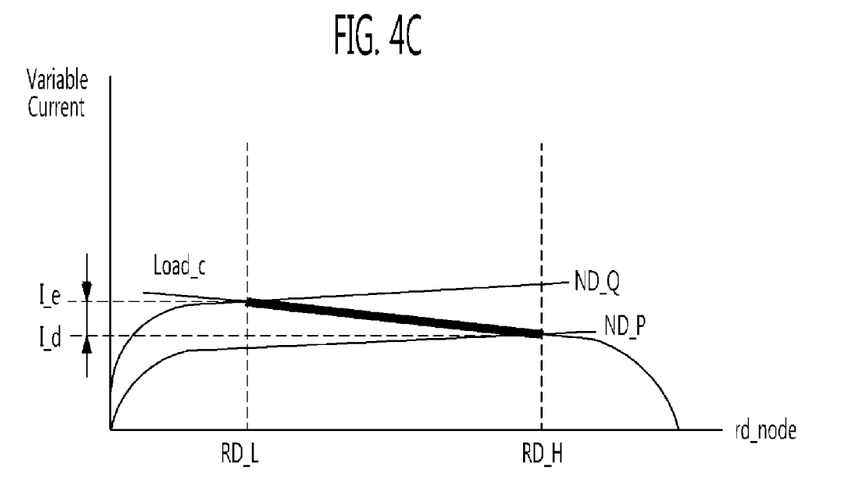

FIG. 4C is a waveform illustrating a current load according to voltage of the control node rd in the high voltage generator 300 of FIG. 3.

Referring to FIGS. 3 and 4C, when the high voltage PMOS transistor M5 is used in the first current determination unit 357 as described above, a third load curve Load_c, such as that shown in FIG. 4C, is obtained. That is, if the high voltage PMOS transistor M5 is used as the current load of the first current determination unit 357 instead of the resistors as in FIG. 2, the second load current I_load_2 can be minimized to a third range I_d to I_e because an increment of current in the saturation mode range of the high voltage PMOS transistor M5 is very small. In this case, the third load curve Load_c is obtained, and the voltage of the control node rd may range from a minimum value RD_L to a maximum value RD_H.

Figure 5:
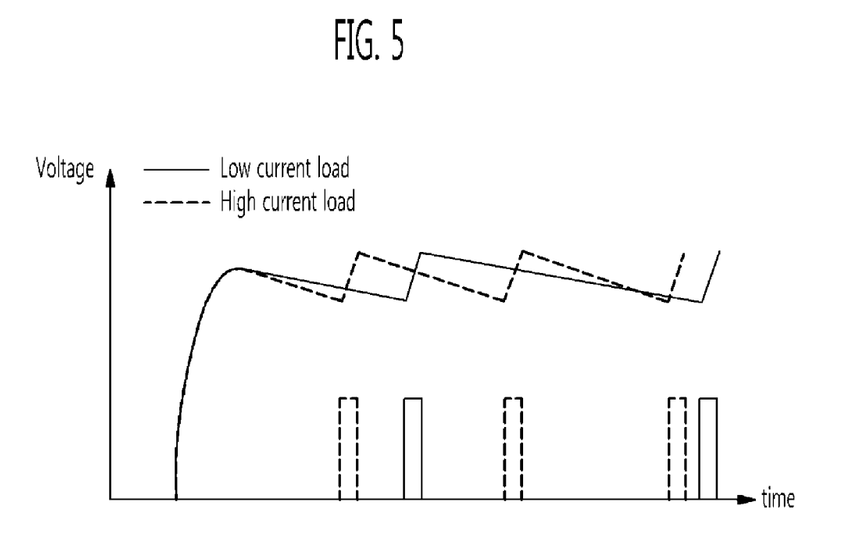
FIG. 5 is a waveform illustrating a number of clock signals supplied depending on a current load of the high voltage generator according to an embodiment of this disclosure.

FIG. 5 is a waveform illustrating the number of clock signals supplied depending on a current load of the high voltage generator according to an embodiment of this disclosure.

Referring to FIG. 5, if the second load current I_load_2 has a low current load (i.e., I_a) because it is changed between the minimum value I_a and the maximum value I_c, the high voltage VPP can be maintained although a clock signal CLOCK is supplied to the charge pump only twice. If the second load current I_load_2 has a high current load (I_c), the high voltage VPP can be maintained only when the clock signal CLOCK is supplied to the charge pump three times or higher. Accordingly, if the amount of the second load current I_load_2 is minimized as in the embodiments of this disclosure, the number of clock signals CLOCK supplied can be reduced.

In accordance with this disclosure, an operating current necessary for a pumping operation can be minimized by controlling a load of the regulator, and thus current consumed by a memory chip can be reduced.

What is claimed is:

1. A regulator, comprising:
a current path unit coupled between an input terminal and a ground terminal and configured to include a first current determination unit coupled between the input terminal and a control node and configured to supply a high voltage of a high voltage generator to the control node so that a first or second current path each having a different current load is selected depending on a voltage of the control node, and a second current determination unit coupled between the control node and the ground terminal and configured to control the voltage of the control node by changing the current load depending on an input voltage;
a voltage supply unit configured to supply the high voltage to an output terminal depending on the voltage of the control node;
a voltage division unit configured to divide the high voltage supplied to the output terminal to create a division voltage; and
an amplification unit configured to amplify a difference between the division voltage of the voltage division unit and a first reference voltage and output an amplified voltage to the second current determination unit,
wherein the first current determination unit comprises:
a first resistor coupled between the input terminal and the control node; and
a first switching element and a second resistor coupled in parallel between the first resistor and the control node,
wherein the first switching element couples the first resistor and the control node depending on the voltage of the control node.

2. The regulator of claim 1, wherein the first switching element couples the first resistor and the control node when the voltage of the control node is a specific level or higher.

3. The regulator of claim 1, wherein the second current determination unit comprises a second switching element coupled between the control node and the ground terminal and configured to couple the control node and the ground terminal in response to an output signal of the amplification unit.

4. The regulator of claim 3, wherein the second switching element is formed of an NMOS transistor having a gate coupled to an output terminal of the amplification unit, a drain coupled to the control node, and a source coupled to the ground terminal.

5. The regulator of claim 1, wherein the voltage supply unit comprises a third switching element for controlling an amount of the high voltage supplied to the output terminal depending on the voltage of the control node.

6. The regulator of claim 5, wherein the third switching element is formed of an NMOS transistor having a gate coupled to the control node, a drain coupled to the input terminal, and a source coupled to the output terminal.

7. The regulator of claim 1, wherein:
the voltage division unit comprises third to sixth resistors coupled in series between the output terminal and the ground terminal, and
the division voltage supplied to the third resistor is inputted to the amplification unit.

8. The regulator of claim 1, wherein the amplification unit has an inverting terminal to which the first reference voltage is inputted and a non-inverting terminal to which the division voltage is inputted.

9. A high voltage generator comprising a first regulator for stabilizing an output voltage of a charge pump into a first regulation voltage and a second regulator for converting the first regulation voltage into a second regulation voltage, wherein the second regulator comprises:
a current path unit coupled between an input terminal and a ground terminal and configured to include a first current determination unit coupled between the input terminal and a control node and configured to supply a high voltage of a high voltage generator to the control node so that a first or second current path having a different current load is selected depending on a voltage of the control node and a second current determination unit coupled between the control node and the ground terminal and configured to control the voltage of the control node by changing the current load depending on an input voltage, where the second regulator is configured to supply a high voltage to an output terminal,
wherein the first current determination unit comprises:
a first resistor coupled between the input terminal and the control node; and
a first switching element and a second resistor coupled in parallel between the first resistor and the control node,
wherein the first switching element electrically couples the first resistor and the control node depending on the voltage of the control node.

10. The high voltage generator of claim 9, wherein the second regulator further comprises a voltage supply unit configured to supply the high voltage to the output terminal depending on the voltage of the control node.

11. The high voltage generator of claim 10, wherein the second regulator further comprises a voltage division unit configured to divide the high voltage supplied to the output terminal to create a division voltage.

12. The high voltage generator of claim 11, wherein the second regulator further comprises an amplification unit configured to amplify a difference between the division voltage of the voltage division unit and a first reference voltage and output an amplified voltage to the second current determination unit.

* * * * *